United States Patent

Sulzer

[11] Patent Number: 5,427,211
[45] Date of Patent: Jun. 27, 1995

[54] PISTON STOP PIN FOR A HYDRAULIC BRAKE

[75] Inventor: Daniel M. Sulzer, Dubuque, Iowa
[73] Assignee: Deere & Company, Moline, Ill.
[21] Appl. No.: 178,695
[22] Filed: Jan. 10, 1994
[51] Int. Cl.[6] ............................................. F16D 65/38
[52] U.S. Cl. ............................... 188/71.8; 188/196 P
[58] Field of Search ............... 188/196 P, 196 R, 717, 188/71.8, 72.4

[56] References Cited

U.S. PATENT DOCUMENTS

| | | | |
|---|---|---|---|
| 2,619,198 | 11/1952 | Freund | 188/196 P |
| 3,085,663 | 4/1963 | Jakeways | 188/196 P |
| 3,095,064 | 6/1963 | Tankersley et al. | 188/196 R |
| 4,993,532 | 2/1991 | Weiss et al. | 188/196 P |
| 5,161,649 | 11/1992 | Carraro | 188/196 P |

FOREIGN PATENT DOCUMENTS

0105977  4/1984  European Pat. Off. ......... 188/196 R

Primary Examiner—Robert J. Oberleitner
Assistant Examiner—Peter M. Poon

[57] ABSTRACT

The invention is directed to a stop pin for a hydraulically actuated brake. The stop pin is provided with a rotation prevention portion for preventing relative rotation between the hydraulic brake piston and the brake housing. The stop pin is provided with a threaded mounting portion for mounting the stop pin to the annular hydraulic brake piston. A hex portion is located adjacent to the threaded mounting portion to facilitate assembly of the stop pin in the hydraulic braking piston. On the other side of the hex nut portion, opposite the threaded mounting portion, the stop pin is provided with a rotation prevention portion which cooperates with the sidewalls of a stop pin bore in the brake housing to prevent relative rotation between the annular piston and the housing. A screw is screwed into the rotation prevention portion and defines a shaft and cap on which is mounted a split sleeve. The split sleeve engages the sidewalls of the stop pin bore and defines the brake release distance.

9 Claims, 2 Drawing Sheets

PISTON STOP PIN FOR A HYDRAULIC BRAKE

BACKGROUND OF THE INVENTION

1. Field of the Invention

The present invention is directed to a stop pin for a hydraulic brake having an rotation prevention portion for preventing rotation between the stationary brake housing and the hydraulic piston.

2. Description of the Prior Art

In the past, hydraulic brake assemblies have been provided with a series of stop pins for controlling the brake release distance, and a series of dowels or guide pins for preventing rotation of the hydraulic piston relative to the brake housing. The stop pins comprise shafts having split sleeves. The distance the split sleeve slides on the shaft defines the brake release distance. The split sleeve engages the sidewalls of the bore in which it is inserted and is self-adjusting by actuation of the brake. When the brake is released the split sleeve maintains its position and the hydraulic piston is confined to its brake release distance maintained by the split sleeve.

To prevent the hydraulic piston from rotating with the brake disc when the brakes are applied, a series of dowels or guide pins are mounted on a stationary brake housing and are received in apertures in the hydraulic piston. The hydraulic piston is free to slide in and out along the dowels as it is applied and released.

SUMMARY

It is an object of the present invention to provide a stop pin having a rotation preventing portion that combines the functions of the dowels or guide pins in the stop pin.

The stop pin of the present invention is provided with a threaded mounting portion for mounting the stop pin to the hydraulic piston. A hex nut portion adjacent to the threaded portion facilitates assembly of the stop pin by making it readily engageable by a wrench. The hex nut portion also provides a stop surface to ensure the stop pin is properly mounted to the hydraulic piston. A rotation preventing portion extends rearwardly from the hex nut portion for engaging the sidewalls of a stop pin bore located on the stationary brake housing for preventing rotation of the hydraulic piston relative to the brake housing. A screw having a threaded shaft and a head is screwed into the rotation preventing portion. A split sleeve is slidably received on the threaded shaft and is used to define the brake release distance.

DETAILED DESCRIPTION

Figure 1:
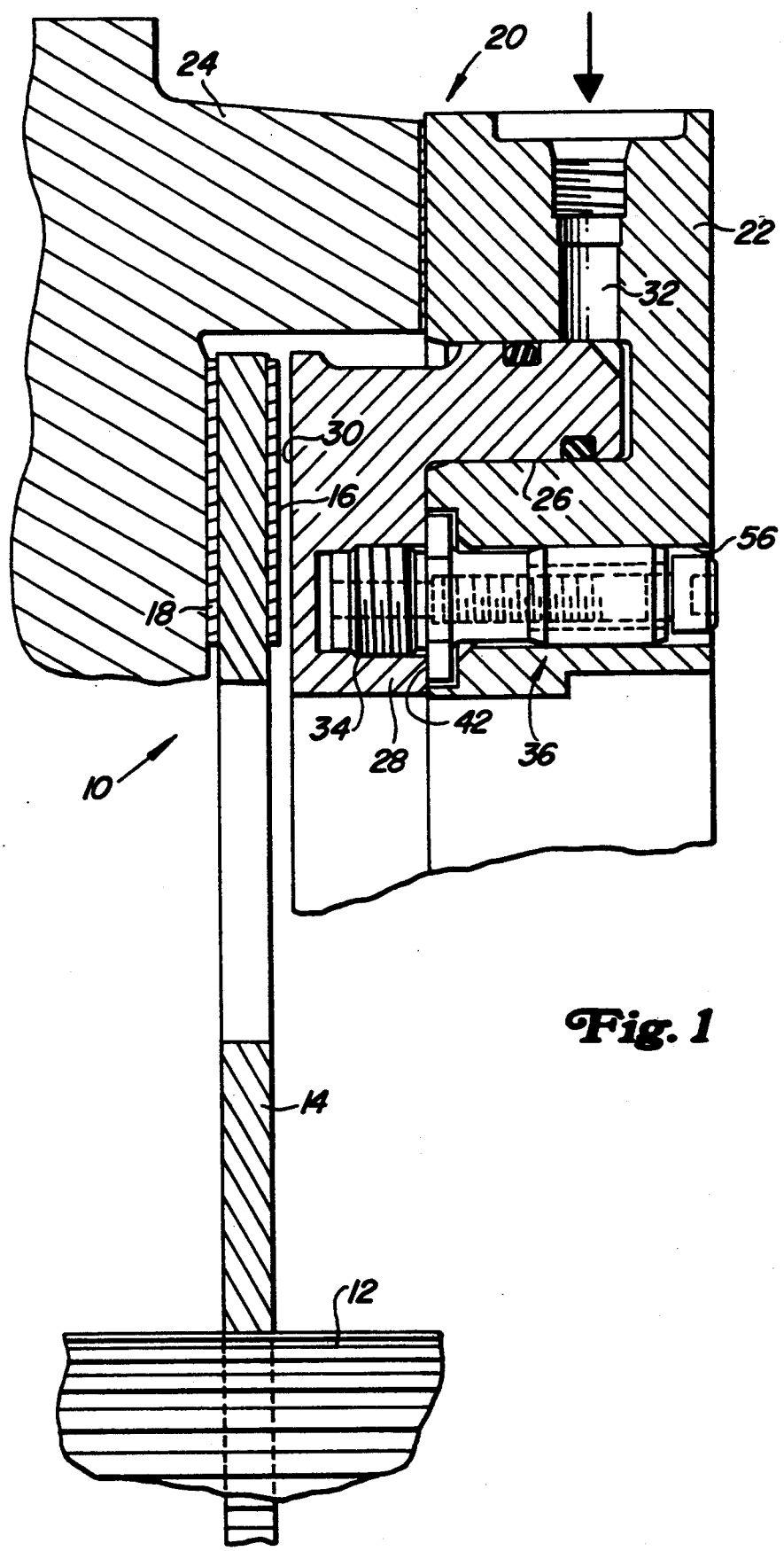
FIG. 1 is a cross sectional view of the brake assembly with the brake being released.

Hydraulic brake 10 is used for braking drive shaft 12. Brake disc 14 is mounted to the drive shaft 12 and extends radially outward therefrom. The brake disc 14 has first and second sides 16 and 18 that are surrounded by stationary brake housing 20. The stationary brake housing comprises two stationary pieces 22 and 24. Stationary piece 22 is provided with an annular hydraulic cylinder 26 in which is slidably mounted hydraulic piston 28. The hydraulic piston is provided with an engagement surface 30 opposite the first side 16 of the brake disc. Hydraulic fluid is applied through hydraulic bore 32 to annular hydraulic cylinder 26. Pressurized hydraulic fluid drives the hydraulic piston 28 outwardly so that the engagement face 30 of the piston 28 engages the first side 16 of the brake disc compressing it against the second stationary piece 24 of the brake housing.

The hydraulic piston 28 is provided with a threaded stop pin aperture 34 into which stop pin 36 is mounted. The stop pin 36 is provided with a threaded portion 38 which is screwed into the stop pin aperture 34. Adjacent to the threaded portion 38 the stop pin is provided with a hex nut portion 40 which facilitates screwing the stop pin into the hydraulic piston 28. The face 42 of the hex nut portion 40 adjacent to the threaded portion forms a stop to ensure proper mounting of the stop pin in the hydraulic piston.

A rotation preventing portion 44 projects outwardly from the hex nut portion 40. This portion 44 takes the place of the previously used dowels or guide pins in preventing relative rotation between the hydraulic piston 28 and the stationary brake housing 20.

The axial center of the rotation preventing portion 44 is provided with a threaded aperture 46 in which the threaded shaft 48 of screw 50 is received. The screw 50 is provided with a head 52 forming a cap to the shaft 48. A split sleeve 54 is slidably mounted on the threaded shaft 48. The split sleeve 54 is placed on the screw 50. The screw is then screwed into the aperture 46 a defined distance so that the split sleeve 54 is free to slide the defined brake release distance on the shaft between the rotation preventing portion and the underside of the cap 52.

First stationary piece 22 of the brake housing 20 is provided with a stop pin bore 56. That portion of bore 56 adjacent to the annular piston is expanded to accommodate the hex nut portion 40 of the stop pin. After the stop pin 36 has been mounted to the hydraulic piston 28, the piston is press fitted onto the first piece 22 of the stationary brake housing 20. The stop pins 36 are aligned with bores 56 and inserted therein. The split sleeve 54 is compressed in the smooth bore 56.

Figure 2:
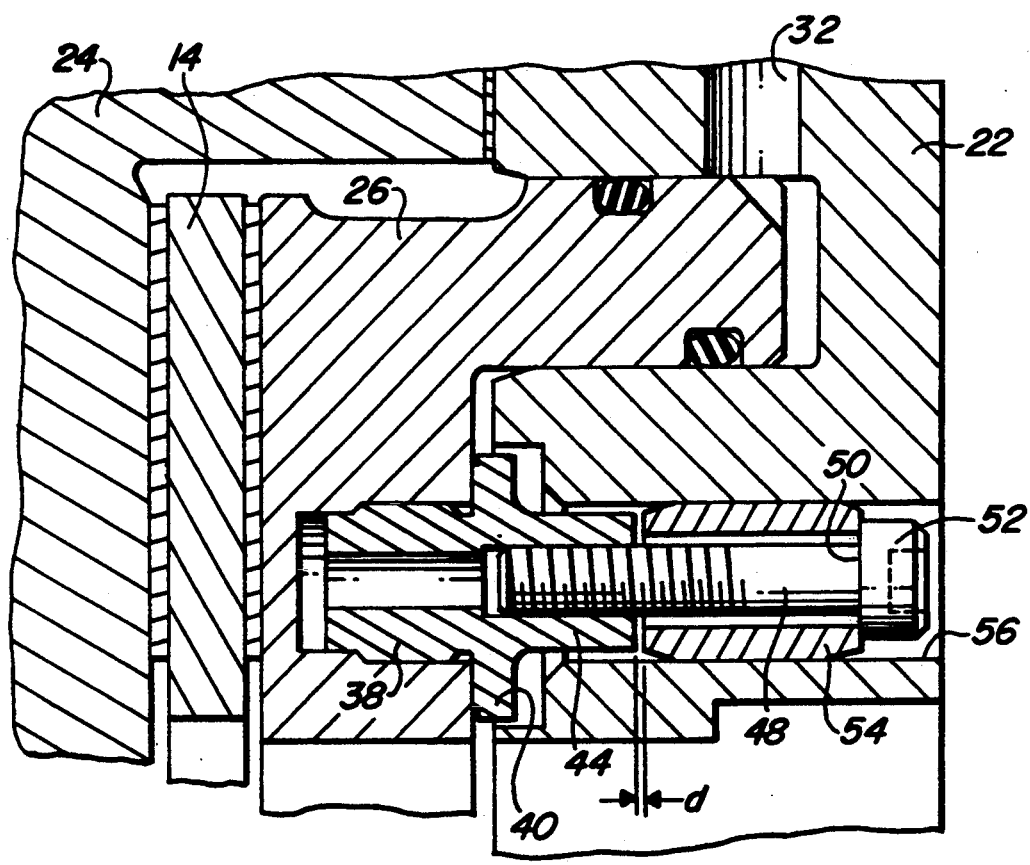
FIG. 2 is an enlarged cross sectional view of the stop pin of the present invention in the brake assembly with the brake being applied.
Figure 3:
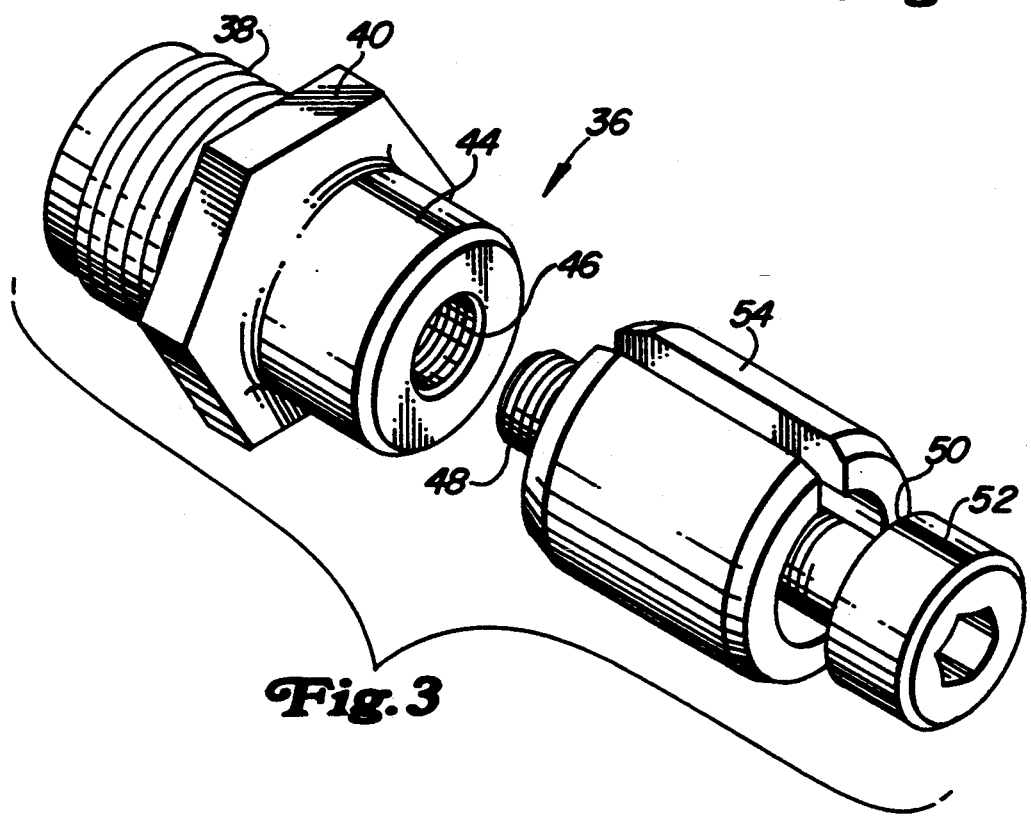
FIG. 3 is an exploded view of the stop pin.

When the brake is first applied, as illustrated in FIG. 2, the annular piston 28 is driven into engagement with brake disc 14. The underside of the cap 52 of the screw 50 pulls the split sleeve towards the brake disc. The brake release distance d is the axial distance between the split sleeve 54 and the rotation preventing portion. After the brake has been released, as illustrated in FIG. 1, the annular piston retreats from the brake disc until the rotation preventing portion 44 engages split sleeve 54 thereby preventing further retreat by the annular piston 28. It should be noted that as the brake disc 14 wears, the split sleeve 54 will take up new positions closer to the brake disc 14 as the hydraulic piston 28 pulls the split sleeve 54 closer and closer to the brake disc 14.

As the engagement face 30 of the annular piston 28 engages the rotating disc 14 torque is applied to the annular piston. Rotation of the annular piston is prevented by the rotation preventing portion 44 engaging the sidewalls of smooth stop pin receiving bore 56.

The subject invention should not be limited by the above-described embodiments, but should be limited solely by the claims that follow.

I claim:

1. A hydraulic brake, comprising: a drive shaft;

a brake disc mounted to the drive shaft and having a first side and a second side;

a stationary housing surrounding the first and second sides of the brake disc and the drive shaft, the stationary housing defining an annular hydraulic cylinder opposite the first side of the brake disc, the stationary housing is also provided with at least one piston stop bore;

an annular hydraulic piston slidably mounted in the annular hydraulic cylinder of the stationary housing, the annular hydraulic piston having an engagement surface for engaging the first side of the brake disc, the hydraulic piston can be hydraulically driven into a brake engagement position so that the engagement surface of the piston is driven against the first side of the brake disc thereby braking the disc and the drive shaft, the piston is provided with at least one piston stop aperture located opposite the piston stop bore of the stationary housing;

at least one piston stop pin is mounted in the piston stop aperture and extends into the piston stop bore, the stop pin is provided with a rotation prevention portion for preventing rotation between the hydraulic piston and the stationary housing, a shaft extending from the rotation prevention portion into the piston stop bore, a cap mounted on the shaft opposite the rotation prevention portion, a substantially non-axially compressible sleeve located between the rotation prevention portion and the cap on the shaft, and a hex nut portion adjacent to the rotation prevention portion forming a stop contacting the piston and ensuring proper mounting of the piston stop pin to the piston.

2. A hydraulic brake as defined by claim 1 wherein the sleeve is free to slide a defined distance between the rotation prevention portion and the cap on the shaft of the stop pin, the defined distance being the brake release distance.

3. A hydraulic brake as defined by claim 2 wherein the shaft and cap comprise a screw that is screwed into the rotation prevention portion, the screw having a head defining the cap.

4. A hydraulic brake as defined by claim 3 wherein the stop pin is provided with a threaded portion that is screwed into the piston stop pin aperture.

5. A hydraulic brake as defined by claim 4 wherein the head of the screw is smaller than the rotation prevention portion.

6. A brake stop pin for a hydraulic brake, the brake stop pin comprising:

a threaded portion for mounting the stop pin to a hydraulic piston;

a rotation prevention portion for preventing rotation between a hydraulic piston and a stationary housing;

a shaft extending from the rotation prevention portion;

a cap mounted on the shaft opposite the rotation prevention portion;

a substantially non-axially compressible sleeve located between the rotation prevention portion and the cap on the shaft; and a hex nut portion located adjacent to the rotation prevention portion forming a stop contacting the piston and ensuring proper mounting of the piston stop pin to the piston.

7. A hydraulic brake as defined by claim 6 wherein the sleeve is free to slide a defined distance between the rotation prevention portion and the cap on the shaft of the stop pin, the defined distance being the brake release distance.

8. A hydraulic brake as defined by claim 7 wherein the shaft and cap comprise a screw that is screwed into the rotation prevention portion, the screw having a head defining the cap.

9. A hydraulic brake as defined by claim 8 wherein the head of the screw is smaller than the rotation prevention portion.

* * * * *